(12) United States Patent
Luo

(10) Patent No.: US 11,339,989 B2
(45) Date of Patent: May 24, 2022

(54) COMMUNICATION METHOD AND DEVICE FOR AIR CONDITIONER, OUTDOOR UNIT, INDOOR UNIT, AND AIR CONDITIONER

(71) Applicants: GD MIDEA AIR-CONDITIONING EQUIPMENT CO., LTD., Foshan (CN); MIDEA GROUP CO., LTD., Foshan (CN)

(72) Inventor: Heng Luo, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 17/282,582

(22) PCT Filed: Mar. 20, 2019

(86) PCT No.: PCT/CN2019/078820
§ 371 (c)(1),
(2) Date: Apr. 2, 2021

(87) PCT Pub. No.: WO2020/073614
PCT Pub. Date: Apr. 16, 2020

(65) Prior Publication Data
US 2021/0348793 A1 Nov. 11, 2021

(30) Foreign Application Priority Data
Oct. 9, 2018 (CN) .......................... 201811173661.9

(51) Int. Cl.
*F24F 11/56* (2018.01)
*F24F 11/64* (2018.01)
(Continued)

(52) U.S. Cl.
CPC .............. *F24F 11/56* (2018.01); *F24F 11/64* (2018.01); *H04L 61/20* (2013.01); *H04L 67/125* (2013.01); *H04L 67/141* (2013.01)

(58) Field of Classification Search
CPC ........... F24F 11/56; F24F 11/64; H04L 61/20; H04L 67/125; H04L 67/141
(Continued)

(56) References Cited

U.S. PATENT DOCUMENTS 8,055,387 B2 * 11/2011 McCoy ................ G05B 19/042
                                                    700/276
8,239,068 B1 * 8/2012 Rossi ....................... F24F 11/30
                                                    700/277
2021/0033300 A1 * 2/2021 Dong ....................... F24F 11/80

FOREIGN PATENT DOCUMENTS

CN        104833047 A        8/2015
CN        104964399 A        10/2015
(Continued)

OTHER PUBLICATIONS

World Intellectual Property Organization (WIPO) International Search Report and Written Opinion for PCT/CN2019/078820 with translation Jun. 12, 2019 22 Pages.
(Continued)

*Primary Examiner* — James E Springer
(74) *Attorney, Agent, or Firm* — Anova Law Group PLLC

(57) ABSTRACT

A communication method includes receiving, from an indoor unit, an indoor unit model, an indoor unit protocol type, and a priority number; determining a communication protocol type and a communication address corresponding to communication with the indoor unit according to the indoor unit model, the indoor unit protocol type, and the priority number; and sending the communication protocol type and the communication address to the indoor unit for
(Continued)

the indoor unit to establish a communicative connection to an outdoor unit according to the communication protocol type and the communication address.

16 Claims, 4 Drawing Sheets

(51) Int. Cl.
  *H04L 61/50* (2022.01)
  *H04L 67/125* (2022.01)
  *H04L 67/141* (2022.01)

(58) Field of Classification Search
  USPC .......................................................... 709/228
  See application file for complete search history.

(56) References Cited

FOREIGN PATENT DOCUMENTS

| | | | | |
|---|---|---|---|---|
| CN | 109373521 | A | 2/2019 | |
| EP | 3793146 | A1 * | 9/2018 | ......... H04L 25/0298 |
| EP | 3518505 | A1 * | 7/2019 | ............. F24F 11/30 |
| JP | 2008301075 | A * | 12/2008 | |
| KR | 20050074825 | A | 7/2005 | |
| KR | 20050103828 | A | 11/2005 | |

OTHER PUBLICATIONS

The State Intellectual Property Office of PRC (SIPO) The First Office Action For CN Application No. 201811173661.9 Jul. 15, 2019 26 Pages (Translation Included).

The State Intellectual Property Office of PRC (SIPO) The Second Office Action For CN Application No. 201811173661.9 Dec. 24, 2019 22 Pages (Translation Included).

The State Intellectual Property Office of PRC (SIPO) The Third Office Action For CN Application No. 201811173661.9 May 12, 2020 14 Pages (Translation Included).

* cited by examiner

COMMUNICATION METHOD AND DEVICE FOR AIR CONDITIONER, OUTDOOR UNIT, INDOOR UNIT, AND AIR CONDITIONER

CROSS-REFERENCE TO RELATED APPLICATION APPLICATIONS

This application is a National Stage Entry under 35 U.S.C. § 371 of International Application No. PCT/CN2019/078820, filed on Mar. 20, 2019, which is based upon and claims priority to Chinese Patent Application No. 201811173661.9, filed on Oct. 9, 2018, the entire contents of both of which are incorporated herein by reference.

FIELD

This application relates to the field of electrical appliances, in particular to a communication method and device for an air conditioner, an outdoor unit, an indoor unit, and an air conditioner.

BACKGROUND

At present, most of frequency-conversion multi-connected air conditioner systems on the market utilize manual addressing, which is achieved by manual adjustment during sales or installation. This method is troublesome in installation and has low efficiency and high labor costs.

In related technology, the RS485-based automatic random addressing communication method for free numbers of air conditioners is usually adopted, which utilizes automatic addressing. As such, the problems of manual addressing such as troublesome installation, low efficiency and high cost are solved.

However, inventors of the present disclosure found that the technology described above has at least the following technical problem:

when multiple indoor units access an outdoor unit at the same time in a period of time, the problem of access conflict may occur, leading to a failure of communication mode of one outdoor unit-to-multiple indoor units.

SUMMARY

The present disclosure in embodiments provides a communication method and device for an air conditioner, an outdoor unit, an indoor unit, and an air conditioner, which solves the problem of access conflict that may occur when multiple indoor units access an outdoor unit at the same time in a period of time in the existing technologies, thereby achieving the communication mode of one outdoor unit-to-multiple indoor units, thus indoor units with multiple protocols can be flexibly configured.

In a first aspect, the present disclosure in embodiments provides a communication method for an air conditioner, the communication method being applied to an outdoor unit, including the steps of:

receiving indoor unit models, indoor unit protocol types and priority numbers sent by a plurality of indoor units;

determining communication protocol types and communication addresses corresponding to communications with the indoor units according to the indoor unit models, the indoor unit protocol types and the priority numbers; and sending the communication protocol types and the communication addresses to corresponding indoor units so that the corresponding indoor units establish communicative connections to the outdoor unit according to the communication protocol types and the communication addresses.

According to an embodiment of the present disclosure, before determining a communication protocol type and a communication address corresponding to communication with each indoor unit according to the indoor unit model, the indoor unit protocol type and the priority number, the communication method further includes:

determining communication levels of the indoor units according to the indoor unit models and the priority numbers; and sequentially calling the plurality of indoor units according to a priority order of the communication levels.

According to an embodiment of the present disclosure, the priority number is generated by the indoor unit according to a pre-stored priority number seed, priority number length and current system time.

In a second aspect, the present disclosure in embodiments provides a communication method for an air conditioner, the communication method being applied to an indoor unit, including the steps of:

sending an indoor unit model, an indoor unit protocol type and a priority number corresponding to the indoor unit to an outdoor unit;

receiving a communication protocol type and a communication address corresponding to communication with the indoor unit sent by the outdoor unit, wherein the communication protocol type and the communication address are determined by the outdoor unit according to the indoor unit model, the indoor unit protocol type and the priority number; and establishing a communicative connection to the outdoor unit according to the communication protocol type and the communication address.

According to an embodiment of the present disclosure, before sending an indoor unit model, an indoor unit protocol type and a priority number corresponding to the indoor unit to an outdoor unit, the communication method further includes:

acquiring a pre-stored priority number seed, priority number length and current system time; and generating the priority number according to the priority number seed, the priority number length and the current system time.

In a third aspect, the present disclosure in embodiments provides a communication device for an air conditioner, including:

a first receiving module, configured to receive indoor unit models, indoor unit protocol types and priority numbers sent by a plurality of indoor units;

a first determining module, configured to determine communication protocol types and communication addresses corresponding to communications with the indoor units according to the indoor unit models, the indoor unit protocol types and the priority numbers; and a first sending module, configured to send the communication protocol types and the communication addresses to corresponding indoor units so that the corresponding indoor units establishes communicative connections to an outdoor unit according to the communication protocol types and the communication addresses.

According to an embodiment of the present disclosure, the communication device further includes:

a second determining module, configured to determine communication levels of the indoor units according to the indoor unit models and the priority numbers; and a calling module, configured to sequentially call the plurality of indoor units according to a priority order of the communication levels.

In a fourth aspect, the present disclosure in embodiments provides a communication device for an air conditioner, including:

a second sending module, configured to send an indoor unit model, an indoor unit protocol type and a priority number corresponding to an indoor unit to an outdoor unit;

a second receiving module, configured to receive a communication protocol type and a communication address corresponding to communication with the indoor unit sent by the outdoor unit, wherein the communication protocol type and the communication address are determined by the outdoor unit according to the indoor unit model, the indoor unit protocol type and the priority number; and an establishing module, configured to establish a communicative connection to the outdoor unit according to the communication protocol type and the communication address.

According to an embodiment of the present disclosure, the communication device further includes:

an acquiring module, configured to acquire a pre-stored priority number seed, priority number length and current system time; and a generating module, configured to generate the priority number according to the priority number seed, the priority number length and the current system time.

In a fifth aspect, the present disclosure in embodiments provides an outdoor unit, including the communication device for an air conditioner described in embodiments of the third aspect.

In a sixth aspect, the present disclosure in embodiments provides an indoor unit, including the communication device for an air conditioner described in embodiments of the fourth aspect.

In a seventh aspect, the present disclosure in embodiments provides an air conditioner, including the outdoor unit described in embodiments of the fifth aspect and/or the indoor unit described in embodiments of the sixth aspect.

In an eighth aspect, the present disclosure in embodiments provides an electronic device, including:

a memory, a processor, and a computer program, stored in the memory and configured to be capable of running on the processor, wherein when executed by the processor, the computer program causes the processor to perform a communication method for an air conditioner described in embodiments of the first aspect or a communication method for an air conditioner described in embodiments of the second aspect.

In a ninth aspect, the present disclosure in embodiments provides a non-transitory computer-readable storage medium having stored therein computer programs that, when executed by a processor, causes the processor to perform a communication method for an air conditioner described in embodiments of the first aspect or a communication method for an air conditioner described in embodiments of the second aspect.

The one or more technical solutions provided by embodiments of the present disclosure may at least have the following beneficial effects.

1. The outdoor unit determines communication protocol types and communication addresses corresponding to communications with the indoor units according to the received indoor unit models, indoor unit protocol types and priority numbers sent by a plurality of indoor units, so that the corresponding indoor units establish communicative connections to the outdoor unit according to the communication protocol types and the communication addresses. Therefore, the problem of access conflict that may occur when multiple indoor units access an outdoor unit at the same time in a period of time is effectively solved, thus achieving the communication mode of one outdoor unit-to-multiple indoor units. As such, indoor units with multiple protocols can be flexibly configured.

2. The outdoor unit determines communication levels of the indoor units according to the indoor unit models and the priority numbers and sequentially calls the plurality of indoor units according to a priority order of the communication levels, thus ensuring a fast response speed for the indoor unit with a high priority communication level and in turn ensuring the throughput (the number of requests processed in a unit time) of the outdoor unit, thereby improving the user experience.

3. The indoor unit sends its corresponding indoor unit model, indoor unit protocol type and priority number to the outdoor unit and establishes a communicative connection to the outdoor unit according to the received communication protocol type and communication address corresponding to communication with the indoor unit sent by the outdoor unit. Therefore, the problem of access conflict that may occur when multiple indoor units access an outdoor unit at the same time in a period of time is effectively solved, thus achieving the communication mode of one outdoor unit-to-multiple indoor units. As such, indoor units with multiple protocols can be flexibly configured.

4. The indoor unit generates a priority number according to the acquired priority number seed, priority number length and current system time, thus can effectively determine the priority level of the indoor unit.

DETAILED DESCRIPTION

The present disclosure in embodiments provides a communication method and device for an air conditioner, an outdoor unit, an indoor unit, and an air conditioner, so as to solve the problem of access conflict that may occur when multiple indoor units access an outdoor unit at the same time in a period of time in the prior art. The outdoor unit determines communication protocol types and communication addresses corresponding to communications with the indoor units according to the received indoor unit models, indoor unit protocol types and priority numbers sent by a plurality of indoor units, so that the corresponding indoor units establish communicative connections to the outdoor unit according to the communication protocol types and the communication addresses. Therefore, the communication mode of one outdoor unit-to-multiple indoor units is achieved, thus indoor units with multiple protocols can be flexibly configured.

In order to better understand the technical solutions described above, exemplary embodiments of the present disclosure will be described in more detail below with reference to the accompanying drawings. Although the drawings show exemplary embodiments of the present disclosure, it should be understood that the present disclosure can be implemented in various forms and should not be limited by the embodiments set forth herein. On the contrary, these embodiments are provided to enable a more thorough understanding of the present disclosure and to fully convey the scope of the present disclosure to those skilled in the art.

In order to better understand the technical solutions described above, the technical solutions will be described in detail below in combination with the accompanying drawings and specific examples of the specification.

Example 1

Figure 1:
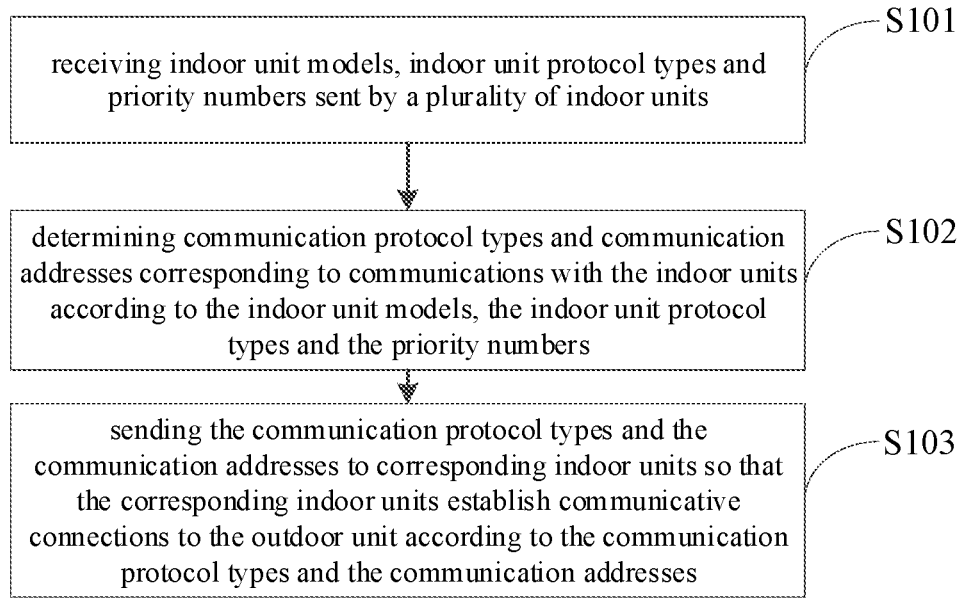
FIG. 1 is a flow chart showing a communication method for an air conditioner according to an embodiment of the present disclosure.

FIG. 1 is a flow chart showing a communication method for an air conditioner according to an embodiment of the present disclosure. The communication method for an air conditioner is applied to an outdoor unit. Referring to FIG. 1, the communication method for an air conditioner includes the following steps.

In step S101, indoor unit models, indoor unit protocol types and priority numbers sent by a plurality of indoor units are received.

In an embodiment of the present disclosure, a plurality of indoor units are at least two indoor units. After the indoor unit and the outdoor unit are powered on, the indoor unit can establish a Transmission Control Protocol (TCP) connection to the outdoor unit. The outdoor unit receives the indoor unit model, the indoor unit protocol type and the priority number sent by the indoor unit through the TCP connection. As a feasible implementation, the priority number of the indoor unit can be generated by a pre-stored priority number seed, priority number length and current system time of the indoor unit. Specifically, the priority number can be generated by a priority number algorithm.

In step S102, communication protocol types and communication addresses corresponding to communications with the indoor unit are determined according to the indoor unit models, the indoor unit protocol types and the priority numbers.

In an embodiment of the present disclosure, a mapping relationship between the indoor unit model, indoor unit protocol type and priority number and the communication protocol type and communication address corresponding to communication with the indoor unit can be established in advance. After the indoor unit model, the indoor unit protocol type and the priority number are obtained in the step S101, the communication protocol type and the communication address corresponding to communication with the indoor unit can be determined by querying the mapping relationship described above.

In step S103, the communication protocol types and the communication addresses are sent to corresponding indoor units so that the corresponding indoor units establish communicative connections to the outdoor unit according to the communication protocol types and the communication addresses.

In an embodiment of the present disclosure, after the communication protocol type and the communication address are determined in step S102, the communication protocol type and the communication address can be sent to the corresponding indoor unit through the TCP connection. The indoor unit establishes a communicative connection to the outdoor unit according to the communication protocol type and the communication address. As a feasible implementation, the communicative connection may specifically be RS485 communication.

The technical solutions in the embodiments of the present disclosure described above have at least the following technical effects or advantages.

The outdoor unit determines communication protocol types and communication addresses corresponding to communications with the indoor units according to the received indoor unit models, indoor unit protocol types and priority numbers sent by a plurality of indoor units, so that the corresponding indoor units establish communicative connections to the outdoor unit according to the communication protocol types and the communication addresses. Therefore, the problem of access conflict that may occur when multiple indoor units access an outdoor unit at the same time in a period of time is effectively solved, thus achieving the communication mode of one outdoor unit-to-multiple indoor units. As such, indoor units with multiple protocols can be flexibly configured.

Example 2

Figure 2:
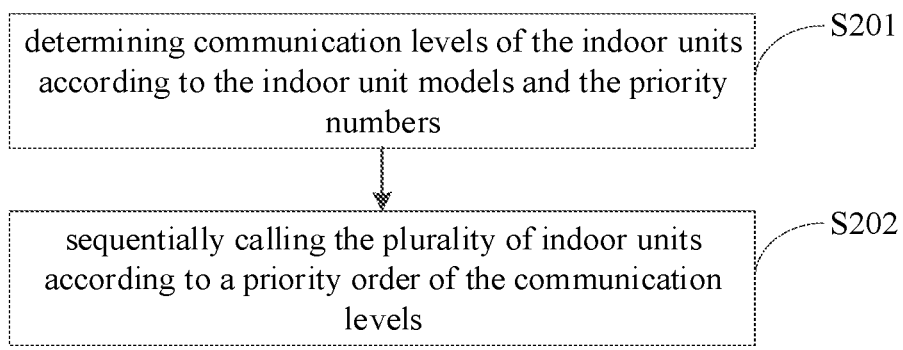
FIG. 2 is a flow chart showing the communication method for an air conditioner before step S102 of the embodiment shown in FIG. 1.

FIG. 2 is a flow chart showing the communication method for an air conditioner before step S102 of the embodiment shown in FIG. 1. Referring to FIG. 2, before the step S102 of the embodiment shown in FIG. 1, the communication method for an air conditioner further includes the following steps.

In step S201, communication levels of the indoor units are determined according to the indoor unit models and the priority numbers.

In an embodiment of the present disclosure, a mapping relationship between the indoor unit model and priority number and the communication level of each indoor unit can be established in advance. After the indoor unit model and the priority number are obtained, the communication level of each indoor unit can be determined by querying the mapping relationship described above. As a feasible implementation, after the communication level of each indoor unit is determined, the determined communication level of each indoor unit can be stored in the memory of the outdoor unit in the form of a two-way queue data structure.

In step S202, the plurality of indoor units are sequentially called according to a priority order of the communication levels.

In an embodiment of the present disclosure, the communication levels of indoor units stored in the two-way queue of the outdoor unit can be traversed and the communication levels of the indoor units can be compared so as to find the communication level with the highest priority. The indoor unit corresponding to the communication level with the highest priority is called, that is, the steps S102 and S103 in the embodiment shown in FIG. 1 are executed on the corresponding indoor unit. After the completion of this calling, the processes described above are repeated to search for the communication level with the highest priority in the two-way queue again and the indoor unit corresponding to the communication level with the highest priority is called until all the indoor units are called.

The technical solutions in the embodiments of the present disclosure described above have at least the following technical effects or advantages.

The outdoor unit determines communication levels of the indoor units according to the indoor unit models and the priority numbers and sequentially calls the plurality of indoor units according to a priority order of the communication levels, thus ensuring a fast response speed for the indoor unit with a high priority communication level and in turn ensuring the throughput (the number of requests processed in a unit time) of the outdoor unit, thereby improving the user experience.

Example 3

Figure 3:
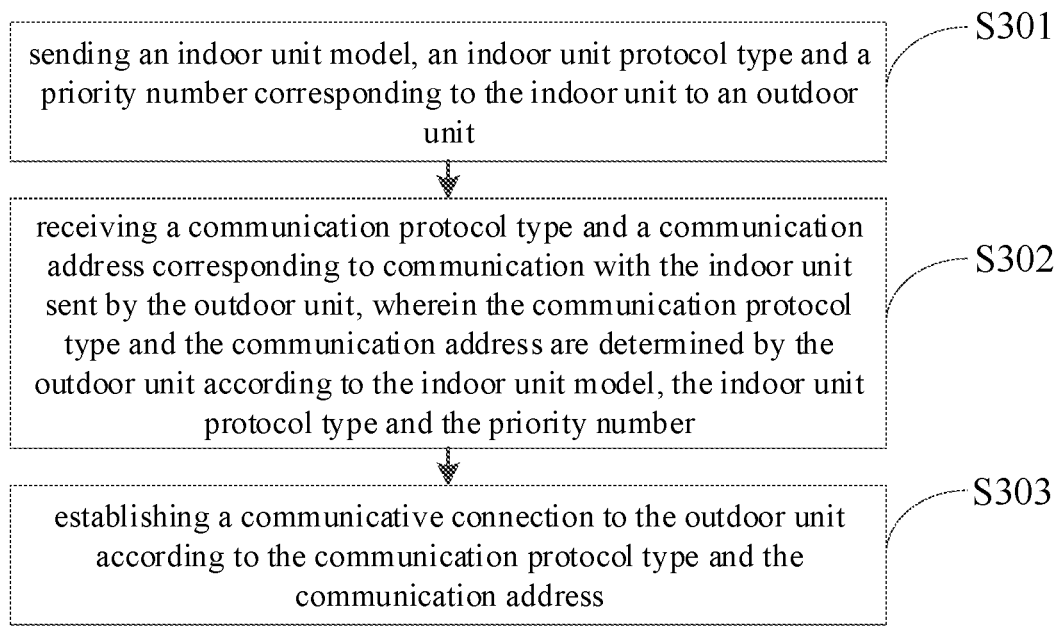
FIG. 3 is a flow chart showing a communication method for an air conditioner according to another embodiment of the present disclosure.

FIG. 3 is a flow chart showing a communication method for an air conditioner according to another embodiment of the present disclosure. The communication method for an air conditioner is applied to an indoor unit. Referring to FIG. 3, the communication method for an air conditioner may include the following steps.

In step S301, an indoor unit model, an indoor unit protocol type and a priority number corresponding to the indoor unit are sent to an outdoor unit.

In an embodiment of the present disclosure, the indoor unit model, the indoor unit protocol type and the priority number corresponding to the indoor unit can be stored in the electrically erasable programmable read only memory (EEPROM) of the indoor unit. The indoor unit can obtain the corresponding indoor unit model, indoor unit protocol type and priority number from the EEPROM, and establish a TCP connection to the outdoor unit. The indoor unit sends the indoor unit model, the indoor unit protocol type and the priority number to the outdoor unit through the TCP connection.

In step S302, a communication protocol type and a communication address corresponding to communication with the indoor unit sent by the outdoor unit are received, in which the communication protocol type and the communication address are determined by the outdoor unit according to the indoor unit model, the indoor unit protocol type and the priority number.

In an embodiment of the present disclosure, the outdoor unit determines the communication protocol type and the communication address corresponding to communication with the indoor unit according to the received indoor unit model, indoor unit protocol type and priority number. The indoor unit can receive the communication protocol type and the communication address corresponding to communication with the indoor unit through a TCP connection.

In step S303, a communicative connection to the outdoor unit is established according to the communication protocol type and the communication address.

In an embodiment of the present disclosure, the indoor unit establishes a communicative connection to the outdoor unit according to the communication protocol type and the communication address received in the step S302. As a feasible implementation, the communicative connection may specifically be RS485 communication.

The technical solutions in the embodiments of the present disclosure described above have at least the following technical effects or advantages.

The indoor unit sends its corresponding indoor unit model, indoor unit protocol type and priority number to the outdoor unit and establishes a communicative connection to the outdoor unit according to the received communication protocol type and communication address corresponding to communication with the indoor unit sent by the outdoor unit. Therefore, the problem of access conflict that may occur when multiple indoor units access an outdoor unit at the same time in a period of time is effectively solved, thus achieving the communication mode of one outdoor unit-to-multiple indoor units. As such, indoor units with multiple protocols can be flexibly configured.

Example 4

Figure 4:
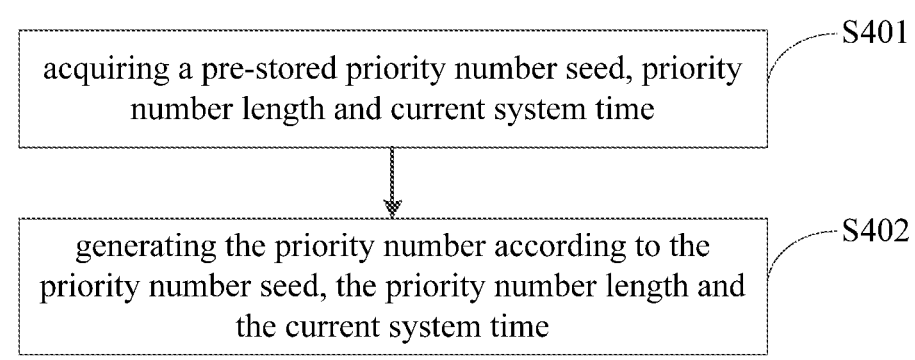
FIG. 4 is a flow chart showing the communication method for an air conditioner before step S301 of the embodiment shown in FIG. 3.

FIG. 4 is a flow chart showing the communication method for an air conditioner before step S301 of the embodiment shown in FIG. 3. Referring to FIG. 4, before the step S301 of the embodiment shown in FIG. 3, the communication method for an air conditioner further includes the following steps.

In step S401, a pre-stored priority number seed, priority number length and current system time are acquired.

In an embodiment of the present disclosure, the priority number seed and priority number length can be pre-stored in the EEPROM of the indoor unit. The indoor unit can acquire the pre-stored priority number seed and priority number length from the EEPROM. At the same time, the indoor unit can acquire the current system time.

In step S402, the priority number is generated according to the priority number seed, the priority number length and the current system time.

In an embodiment of the present disclosure, the indoor unit generates the priority number according to the priority number seed, the priority number length and the current system time. Specifically, the priority number can be generated by a priority number algorithm.

The technical solutions in the embodiments of the present disclosure described above have at least the following technical effects or advantages.

The indoor unit generates a priority number according to the acquired priority number seed, priority number length and current system time, thus can effectively determine the priority level of the indoor unit.

Based on the same application concept, the present disclosure in embodiments provides devices corresponding to a communication method for an air conditioner in Example 1 and a communication method for an air conditioner in Example 2, referring to Example 5.

Example 5

Figure 5:
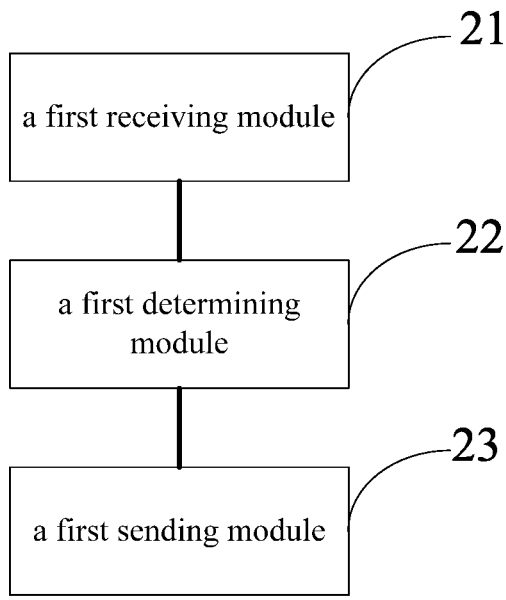
FIG. 5 is a structural diagram of a communication device for an air conditioner according to an embodiment of the present disclosure.

FIG. 5 is a structural diagram of a communication device for an air conditioner according to an embodiment of the present disclosure. Referring to FIG. 5, the communication device for an air conditioner includes the follows:

a first receiving module 21, configured to receive indoor unit models, indoor unit protocol types and priority numbers sent by a plurality of indoor units;

a first determining module 22, configured to determine communication protocol types and communication addresses corresponding to communications with the indoor units according to the indoor unit models, the indoor unit protocol types and the priority numbers; and a first sending module 23, configured to send the communication protocol types and the communication addresses to corresponding indoor units so that the corresponding indoor units establish communicative connections to an outdoor unit according to the communication protocol types and the communication addresses.

Further, in a feasible implementation of the present disclosure, the communication device for an air conditioner further includes:

a second determining module, configured to determine communication levels of the indoor units according to the indoor unit models and the priority numbers; and a calling module, configured to sequentially call the plurality of indoor units according to a priority order of the communication levels.

Since the device introduced in Example 5 of the present disclosure is a device used to implement the method of Example 1 and the method of Example 2 of the present disclosure, those skilled in the art can understand the specific structure and modification of the device based on the methods introduced in Example 1 and Example 2 of the present disclosure, which will not be repeated herein. All the devices used in the methods of Example 1 and Example 2 of the present disclosure belong to the protection scope of the present disclosure.

The technical solutions in the embodiments of the present disclosure described above have at least the following technical effects or advantages.

1. The outdoor unit determines communication protocol types and communication addresses corresponding to communications with the indoor units according to the received indoor unit models, indoor unit protocol types and priority numbers sent by a plurality of indoor units, so that the corresponding indoor units establish communicative connections to the outdoor unit according to the communication protocol types and the communication addresses. Therefore, the problem of access conflict that may occur when multiple indoor units access an outdoor unit at the same time in a period of time is effectively solved, thus achieving the communication mode of one outdoor unit-to-multiple indoor units. As such, indoor units with multiple protocols can be flexibly configured.

2. The outdoor unit determines communication levels of the indoor units according to the indoor unit models and the priority numbers and sequentially calls the plurality of indoor units according to a priority order of the communication levels, thus ensuring a fast response speed for the indoor unit with a high priority communication level and in turn ensuring the throughput (the number of requests processed in a unit time) of the outdoor unit, thereby improving the user experience.

Based on the same application concept, the present disclosure in embodiments provides devices corresponding to a communication method for an air conditioner in Example 3 and a communication method for an air conditioner in Example 4, referring to Example 6.

Example 6

Figure 6:
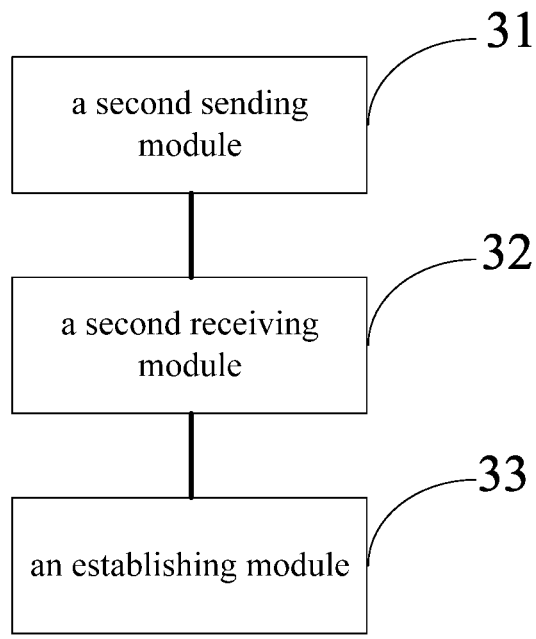
FIG. 6 is a structural diagram of a communication device for an air conditioner according to another embodiment of the present disclosure.

FIG. 6 is a structural diagram of a communication device for an air conditioner according to another embodiment of the present disclosure. Referring to FIG. 6, the communication device for an air conditioner includes:

a second sending module 31, configured to send an indoor unit model, an indoor unit protocol type and a priority number corresponding to an indoor unit to an outdoor unit;

a second receiving module 32, configured to receive a communication protocol type and a communication address corresponding to communication with the indoor unit sent by the outdoor unit, in which the communication protocol type and the communication address are determined by the outdoor unit according to the indoor unit model, the indoor unit protocol type and the priority number; and an establishing module 33, configured to establish a communicative connection to the outdoor unit according to the communication protocol type and the communication address.

Further, in a feasible implementation of the present disclosure, the communication device for an air conditioner further includes:

an acquiring module, configured to acquire a pre-stored priority number seed, priority number length and current system time; and a generating module, configured to generate the priority number according to the priority number seed, the priority number length and the current system time.

Since the device introduced in Example 6 of the present disclosure is a device used to implement the method of Example 3 and the method of Example 4 of the present disclosure, thus those skilled in the art can understand the specific structure and modification of the device based on the methods introduced in Example 3 and Example 4 of the present disclosure, which will not be repeated herein. All the devices used in the methods of Example 3 and Example 4 of the present disclosure belong to the protection scope of the present disclosure.

The technical solutions in the embodiments of the present disclosure described above have at least the following technical effects or advantages.

1. The indoor unit sends its corresponding indoor unit model, indoor unit protocol type and priority number to the outdoor unit and establishes a communicative connection to the outdoor unit according to the received communication protocol type and communication address corresponding to communication with the indoor unit sent by the outdoor unit. Therefore, the problem of access conflict that may occur when multiple indoor units access an outdoor unit at the same time in a period of time is effectively solved, thus achieving the communication mode of one outdoor unit-to-multiple indoor units. As such, indoor units with multiple protocols can be flexibly configured.

2. The indoor unit generates a priority number according to the acquired priority number seed and priority number length pre-stored and current system time, thus can effectively determine the priority level of the indoor unit.

Based on the same application concept, the present disclosure in embodiments provides an outdoor unit corresponding to the device in Example 5, referring to Example 7.

Example 7

Figure 7:
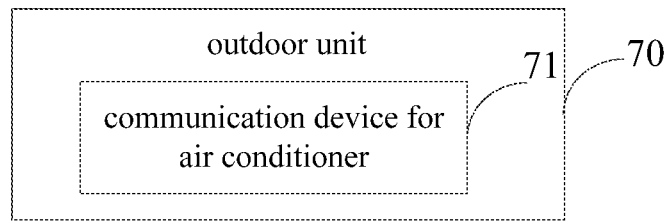
FIG. 7 is a structural diagram of an outdoor unit according to an embodiment of the present disclosure.

FIG. 7 is a structural diagram of an outdoor unit according to an embodiment of the present disclosure. Referring to FIG. 7, the outdoor unit 70 includes: a communication device for an air conditioner 71 shown in Example 5.

Based on the same application concept, the present disclosure in embodiments provides an indoor unit corresponding to the device in Example 6, referring to Example 8.

Example 8

Figure 8:
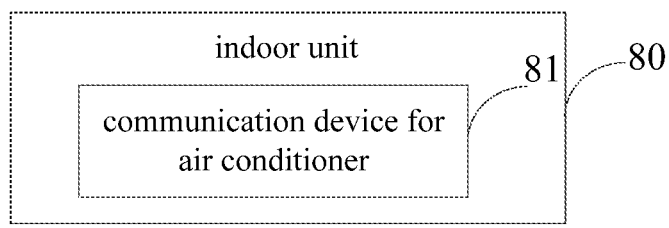
FIG. 8 is a structural diagram of an indoor unit according to an embodiment of the present disclosure.

FIG. 8 is a structural diagram of an indoor unit according to an embodiment of the present disclosure. Referring to FIG. 8, the indoor unit 80 includes: a communication device for an air conditioner 81 shown in Example 6.

Based on the same application concept, the present disclosure in embodiments provides an air conditioner corresponding to the outdoor unit shown in Example 7 and the indoor unit shown in Example 8, referring to Example 9.

Example 9

Figure 9:
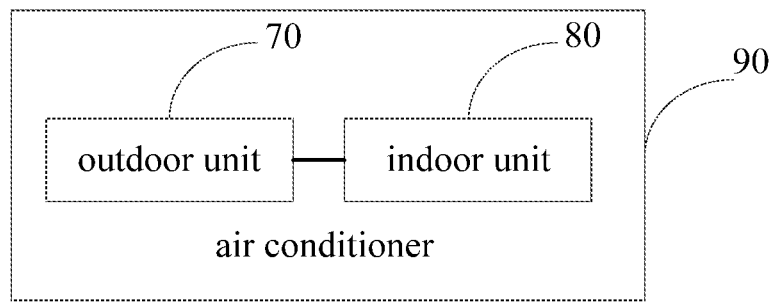
FIG. 9 is a structural diagram of an air conditioner according to an embodiment of the present disclosure.

FIG. 9 is a structural diagram of an air conditioner according to an embodiment of the present disclosure. Referring to FIG. 9, the air conditioner 90 includes an outdoor unit 70 shown in Example 7 and/or an indoor unit 80 shown in Example 8.

Based on the same application concept, the present disclosure in embodiments provides an electronic device corresponding to the communication method for an air conditioner shown in Examples 1, 2, 3 and 4, referring to Example 10.

Example 10

Figure 10:
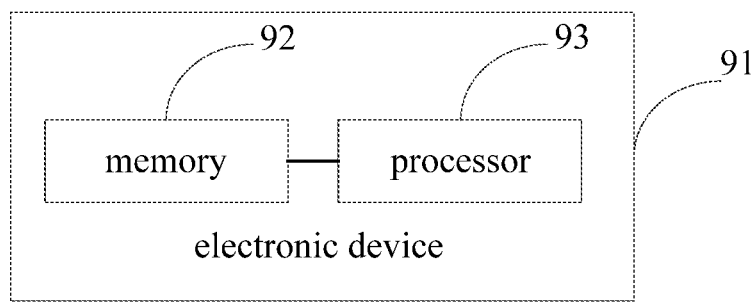
FIG. 10 is a structural diagram of an electronic device according to an embodiment of the present disclosure.

FIG. 10 is a structural diagram of an electronic device according to an embodiment of the present disclosure.

Referring to FIG. 10, the electronic device 91 includes:
a memory 92,
a processor 93, and
a computer program, stored in the memory 92 and configured to be capable of running on the processor, in which when executed by the processor 93, the computer program causes the processor 93 to perform a communication method for an air conditioner shown in the above Examples.

Based on the same application concept, the present disclosure in embodiments provides a non-transitory computer-readable storage medium corresponding to the communication method for an air conditioner shown in Examples 1, 2, 3 and 4, referring to Example 11.

Example 11

The non-transitory computer-readable storage medium has stored therein computer programs that, when executed by a processor, causes the processor to perform a communication method for an air conditioner shown in the above Examples.

Those skilled in the art should understand that the examples of the present disclosure can be provided as a method, a system, or a computer program product. Therefore, the present disclosure may adopt the form of a complete hardware example, a complete software example, or an example combining software and hardware. Moreover, the present disclosure may adopt the form of a computer program product implemented on one or more computer-usable storage media (including but not limited to disk storage, Compact Disc Read-Only Memory (CD-ROM), optical storage, and the like) containing computer-usable program codes.

The present disclosure is described with reference to flow charts and/or block diagrams of methods, devices (systems) and computer program products according to examples of the present disclosure. It should be understood that each process and/or block in the flow chart and/or block diagram, and the combination of processes and/or blocks in the flow chart and/or block diagram can be realized by computer program instructions. These computer program instructions can be provided to the processor of a general-purpose computer, a special-purpose computer, an embedded processor or other programmable data processing equipment to generate a machine, so that the instructions executed by the processor of the computer or other programmable data processing equipment produce a device that realizes the functions specified in one process or multiple processes in the flow chart and/or one block or multiple blocks in the block diagram.

These computer program instructions may also be stored in a computer-readable memory that can direct a computer or other programmable data processing equipment to work in a specific manner, so that the instructions stored in the computer-readable memory produce an article of manufacture including an instruction device. The instruction device implements the functions specified in one process or multiple processes in the flow chart and/or one block or multiple blocks in the block diagram.

These computer program instructions may also be loaded on a computer or other programmable data processing equipment, so that a series of operation steps are executed on the computer or other programmable equipment to produce computer-implemented processing, therefore the instructions executed on the computer or other programmable equipment provide steps for implementing the functions specified in one process or multiple processes in the flow chart and/or one block or multiple blocks in the block diagram.

It should be noted that, in the claims, any reference signs located between parentheses should not be constructed as limitations on the claims. The word "comprising" does not exclude the presence of components or steps not defined in the claims. The word "a" or "an" preceding a component does not exclude the presence of multiple such components. The present disclosure can be realized by means of hardware including several different components and by means of a suitably programmed computer. In the unit claims enumerating several devices, several of these devices may be embodied in the same hardware item. The use of the words "first," "second," "third" and the like do not indicate any order. These words can be interpreted as names.

Although the preferred embodiments of the present disclosure have been described, those skilled in the art can make additional changes and modifications to these embodiments once they learn the basic creative concept. Therefore, the appended claims are intended to be interpreted as including the preferred embodiments and all changes and modifications falling within the scope of the present disclosure.

Obviously, those skilled in the art can make various changes and modifications to the application without departing from the spirit and scope of the present disclosure. As such, if these modifications and variations of the present disclosure fall within the scope of the claims of the present disclosure and their equivalent technologies, the present disclosure is also intended to include these modifications and variations.

What is claimed is:

1. A communication method comprising:
receiving, from an indoor unit, an indoor unit model, an indoor unit protocol type, and a priority number, the priority number being generated by the indoor unit according to a pre-stored priority number seed, a pre-stored priority number length, and a current system time;

determining a communication protocol type and a communication address corresponding to communication with the indoor unit according to the indoor unit model, the indoor unit protocol type, and the priority number; and sending the communication protocol type and the communication address to the indoor unit for the indoor unit to establish a communicative connection to an outdoor unit according to the communication protocol type and the communication address.

2. The communication method according to claim 1, further comprising, before determining the communication protocol type and the communication address:

determining a communication level of the indoor unit according to the indoor unit model and the priority number; and calling the indoor unit according to the communication level.

3. The communication method according to claim 1, wherein the indoor unit is one of a plurality of indoor units to establish communicative connections to the outdoor unit;

the method further comprising, before determining corresponding communication protocol types and communication addresses for the plurality of indoor units:

determining respective communication levels of the plurality of indoor units according to respective corresponding indoor unit models and respective corresponding priority numbers of the plurality of indoor units; and sequentially calling the plurality of indoor units according to a priority order of the communication levels.

4. A non-transitory computer-readable storage medium storing a computer program that, when executed by a processor, causes the processor to perform the communication method according to claim 1.

5. A communication method comprising:

generating a priority number corresponding to an indoor unit according to a pre-stored priority number seed, a pre-stored priority number length, and a current system time;

sending an indoor unit model, an indoor unit protocol type, and the priority number corresponding to the indoor unit to an outdoor unit;

receiving, from the outdoor unit, a communication protocol type and a communication address corresponding to communication with the indoor unit, the communication protocol type and the communication address being determined by the outdoor unit according to the indoor unit model, the indoor unit protocol type, and the priority number; and establishing a communicative connection to the outdoor unit according to the communication protocol type and the communication address.

6. The communication method according to claim 5, further comprising, before generating the priority number:

acquiring the pre-stored priority number seed, the pre-stored priority number length, and the current system time.

7. A non-transitory computer-readable storage medium storing a computer program that, when executed by a processor, causes the processor to perform the communication method according to claim 5.

8. An electronic device comprising:

a memory storing a computer program; and a processor configured to execute the compute program to:

receive, from an indoor unit, an indoor unit model, an indoor unit protocol type, and a priority number, the priority number being generated by the indoor unit according to a pre-stored priority number seed, a pre-stored priority number length, and a current system time;

determine a communication protocol type and a communication address corresponding to communication with the indoor unit according to the indoor unit model, the indoor unit protocol type, and the priority number; and send the communication protocol type and the communication address to the indoor unit for the indoor unit to establish a communicative connection to an outdoor unit according to the communication protocol type and the communication address.

9. The electronic device according to claim 8, wherein the processor is further configured to execute the computer program to, before determining the communication protocol type and the communication address:

determine a communication level of the indoor unit according to the indoor unit model and the priority number; and call the indoor unit according to the communication level.

10. The electronic device according to claim 8, wherein:

the indoor unit is one of a plurality of indoor units to establish communicative connections to the outdoor unit; and the processor is further configured to execute the computer program to, before determining corresponding communication protocol types and communication addresses for the plurality of indoor units:

determine respective communication levels of the plurality of indoor units according to respective corresponding indoor unit models and respective corresponding priority numbers of the plurality of indoor units; and sequentially call the plurality of indoor units according to a priority order of the communication levels.

11. An outdoor unit comprising the electronic device according to claim 8.

12. An air conditioner comprising the outdoor unit according to claim 11.

13. An electronic device comprising:

a memory storing a computer program; and a processor configured to execute the compute program to:

generate a priority number corresponding to an indoor unit according to a priority number seed, a priority number length, and a current system time;

send an indoor unit model, an indoor unit protocol type, and the priority number corresponding to the indoor unit to an outdoor unit;

receive, from the outdoor unit, a communication protocol type and a communication address corresponding to communication with the indoor unit, the communication protocol type and the communication address being determined by the outdoor unit according to the indoor unit model, the indoor unit protocol type, and the priority number; and establish a communicative connection to the outdoor unit according to the communication protocol type and the communication address.

14. The electronic device according to claim 13, wherein the processor is further configured to execute the computer program to:

acquire the pre-stored priority number seed, the pre-stored priority number length, and the current system time.

15. An indoor unit comprising the electronic device according to claim 14.

16. An air conditioner comprising the indoor unit according to claim 15.

\* \* \* \* \*